(12) United States Patent
Charpentier et al.

(10) Patent No.: US 12,044,141 B2
(45) Date of Patent: Jul. 23, 2024

(54) METHOD FOR REPAIRING A TURBOMACHINE ROTOR BLADE

(71) Applicant: SAFRAN AIRCRAFT ENGINES, Paris (FR)

(72) Inventors: Sébastien Maurice Lucien Charpentier, Moissy-Cramayel (FR); Sébastien Jean François Rix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 393 days.

(21) Appl. No.: 17/432,447

(22) PCT Filed: Feb. 21, 2020

(86) PCT No.: PCT/FR2020/050335
§ 371 (c)(1),
(2) Date: Aug. 19, 2021

(87) PCT Pub. No.: WO2020/169938
PCT Pub. Date: Aug. 27, 2020

(65) Prior Publication Data
US 2022/0145762 A1 May 12, 2022

(30) Foreign Application Priority Data

Feb. 21, 2019 (FR) ........................................ 1901778

(51) Int. Cl.
| | | |
|---|---|---|
| *F01D 5/14* | (2006.01) | |
| *B23K 26/342* | (2014.01) | |
| *B23K 37/00* | (2006.01) | |
| *B23P 6/00* | (2006.01) | |
| *B29C 73/00* | (2006.01) | |
| *F01D 5/28* | (2006.01) | |
| *B23K 101/00* | (2006.01) | |

(Continued)

(52) U.S. Cl.
CPC ............ *F01D 5/147* (2013.01); *B23K 26/342* (2015.10); *B23K 37/003* (2013.01); *B23P 6/007* (2013.01);

(Continued)

(58) Field of Classification Search
CPC ....... F01D 5/282; F01D 5/147; B23K 26/342; B23K 37/003; B23P 6/007; B29C 73/00
See application file for complete search history.

(56) References Cited

U.S. PATENT DOCUMENTS

2004/0083024 A1* 4/2004 Wang ..................... B23K 26/32
700/195
2016/0209131 A1* 7/2016 Jones .................... F01D 25/285

FOREIGN PATENT DOCUMENTS

DE   10 2010 006 384 A1   8/2011
EP        2 327 812 A1   6/2011

(Continued)

OTHER PUBLICATIONS

English translation of Written Opinion mailed May 12, 2020, issued in corresponding International Application No. PCT/FR2020/050335, filed Feb. 21, 2020, 5 pages.

(Continued)

*Primary Examiner* — Mathieu D Vargot
(74) *Attorney, Agent, or Firm* — CHRISTENSEN O'CONNOR JOHNSON KINDNESS PLLC

(57) ABSTRACT

A disclosed method is suitable for repairing a blade of a turbomachine rotor, particularly a turbomachine fan, that includes a vane made from an organic-matrix composite and a metallic shield that is bonded to a leading edge of the vane and has a damaged region. The method includes steps of resetting the leading edge of the vane cooling the entire vane, followed by a step of refilling the damaged region by adding a metallic material to this damaged region and melting the material using a laser, and a step of tailoring the damaged region by machining the molten material.

19 Claims, 2 Drawing Sheets

(51) Int. Cl.
*B23K 103/00* (2006.01)
*B23K 103/14* (2006.01)
*B29L 31/08* (2006.01)

(52) U.S. Cl.
CPC .............. *B29C 73/00* (2013.01); *F01D 5/282* (2013.01); *B23K 2101/001* (2018.08); *B23K 2103/14* (2018.08); *B23K 2103/52* (2018.08); *B29L 2031/082* (2013.01); *F05D 2220/32* (2013.01); *F05D 2230/80* (2013.01); *F05D 2240/30* (2013.01)

(56) References Cited

FOREIGN PATENT DOCUMENTS

| | | |
|---|---|---|
| EP | 3 045 260 A1 | 7/2016 |
| FR | 3 045 710 A1 | 6/2017 |
| FR | 3 046 557 A1 | 7/2017 |

OTHER PUBLICATIONS

International Preliminary Report on Patentability mailed Aug. 10, 2021, issued in corresponding International Application No. PCT/FR2020/050335, filed Feb. 21, 2020, 6 pages.
International Search Report mailed May 12, 2020, issued in corresponding International Application No. PCT/FR2020/050335, filed Feb. 21, 2020, 6 pages.
Written Opinion mailed May 12, 2020, issued in corresponding International Application No. PCT/FR2020/050335, filed Feb. 21, 2020, 5 pages.

* cited by examiner

METHOD FOR REPAIRING A TURBOMACHINE ROTOR BLADE

FIELD OF THE DISCLOSURE

The present disclosure relates to a method for repairing a turbomachine propeller blade, in particular a fan of this turbomachine.

BACKGROUND

The prior art comprises, in particular, the documents EP-A1-3045260, DE-A1-102010006384 and FR-A1-3046557.

An aircraft turbomachine comprises one or more propellers which may be ducted or unducted. The present disclosure applies in particular to the blades of a fan, i.e. the blades of a ducted propeller, but also to other types of propellers, such as the unducted propellers of turboprop engines for example.

A turbomachine propeller is traversed by an air flow and its blades can suffer damage by wear or impact, for example of the FOD (Flying Object Damage) type caused by the impact of a bird on the blades.

The present disclosure relates to the repair of a propeller blade with a damaged region, and more particularly to a propeller blade comprising a vane made from an organic matrix-composite (OMC) and a metal shield bonded to a leading edge of the vane.

In a known manner, the OMC vane may comprise a woven preform embedded in a polymeric matrix. The preform is obtained by weaving carbon fibres in three dimensions.

The shield, as described in the application FR-A1-3 046 557, comprises two lateral wings extending respectively on a pressure side and a suction side of the vane, and a nose connecting the two wings. In particular, these two lateral wings and this nose being highly exposed to the flow of gas passing through the propeller are particularly subject to risks of wear by abrasion, impact or erosion. In particular, the nose, which is oriented towards the upstream side of the turbomachine and forms the leading edge of the gas flow passing through the propeller during operation, is the most exposed to the risks of damage.

The present disclosure provides a simple, effective and economical solution for repairing a propeller blade of this type.

SUMMARY

The present disclosure proposes a method for repairing a blade of a turbomachine propeller, in particular a turbomachine fan, this blade comprising a vane made from an organic-matrix composite and a metal shield bonded to a leading edge of the vane, the metal shield having a damaged region, the method comprising a step of refilling the damaged region, by adding a metal material to this damaged region and laser melting the material, and a step of tailoring the metal region by machining the molten material.

The disclosure thus proposes to repair the shield of the blade in situ, i.e., without taking off and removing the shield from the blade. This is particularly advantageous as it simplifies and accelerates the repair of this type of blade and avoids scrapping a blade when the shield is damaged but remains repairable.

According to the disclosure, prior to the refilling and tailoring steps, the method comprises a step of resetting the leading edge of the vane and a step of cooling the entire vane.

The addition of a step of resetting the leading edge upstream of the step of refilling of the damaged region allows the actual profile (or the geometry) of the damaged leading edge to be accurately measured. Indeed, the blades after use in a turbomachine may be deformed (so-called blade with a real profile) and would therefore no longer correspond to the dimensions of the new blades just out of production (so-called blade with a theoretical profile). Thus, the method according to the disclosure enables to specifically repair the damaged region of the blade according to the actual profile of its leading edge (which may have changed with respect to its theoretical profile). In addition, this resetting step allows the damaged region(s) on the leading edge of the blade to be accurately identified. This allows the refilling step to deposit the strictly necessary quantity of material and to the millimetre of the damaged region to be repaired.

The addition of a step of cooling of the vane before the refilling step allows the temperature of the leading edge of the vane to be controlled near the glue joint or the interface between the two materials (i.e. the metal shield of the leading edge and the vane made from an organic matrix composite). Indeed, the entire volume of the vane is cooled, so as to maintain the vane at a maximum acceptable temperature (possibly 120° C.) for the glue joint during the step of depositing and melting the material on the damaged region of the blade. Thus, in general, the refilling parameters to achieve a laser melting of the material are optimised, while avoiding local overheating and degradation of the vane.

The method according to the disclosure may comprise one or more of the following features and/or steps, taken in isolation from each other or in combination with each other:
  the resetting step is performed before or simultaneously with the cooling step,
  the resetting step is performed by means of a movable probe,
  the vane is cooled to a temperature between +20 and −20° C., preferably between 0 and −20° C.,
  the metal shield comprises two lateral wings extending respectively on a pressure side and a suction side of the vane, and a nose connecting the two wings, the damaged region being located on the nose,
  a temperature threshold is predetermined, this temperature threshold corresponding to a maximum temperature allowed by the glue and/or the vane, the laser melting being performed by means of a machine, the parameters of which are set to prevent the glue and/or the vane from reaching this threshold,
  the threshold is 120° C.,
  the filler material is identical to the material of the shield,
  the filler material is TA6V,
  the filler material is titanium carbide TiC,
  at least during the refilling step, the blade is held on a frame so that the region is oriented upwards,
  the region is cooled during the refilling step,
  the cooling is performed by conduction, by neutral gas at room temperature, by cooled neutral gas, by projection of liquid or solid elements, etc.
  the cooling is ensured by cryogenics or by the Peltier effect,
  the laser melting is performed by means of a mobile laser head, the resetting and refilling steps are performed by means of a single apparatus comprising, respectively, the probe and the laser head, and wherein the apparatus is capable, by pivoting, on the one hand, to bring the probe into contact with the leading edge of the vane during the resetting step, and on the other hand, to bring the laser head to face the leading edge of the vane during the refilling step, and the laser melting is performed by LMD (acronym for Laser Metal Deposition) or µlaser.

DESCRIPTION OF THE DRAWINGS

Further features and advantages of the disclosure will become apparent from the following detailed description, for the understanding of which reference is made to the attached drawings in which.

DETAILED DESCRIPTION

Figure 1:
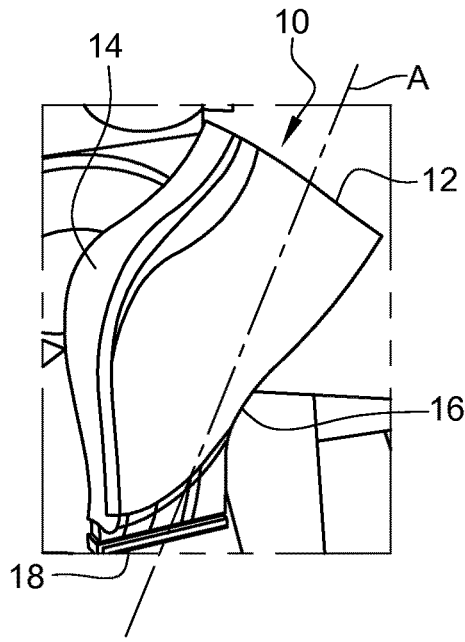
FIG. 1 is a schematic perspective view of a turbomachine propeller blade, and in particular of a turbomachine fan.

FIG. 1 shows a propeller blade 10 and in particular a fan of an aircraft turbomachine. This blade 10 comprises a vane 12 made from an organic-matrix composite and a metal shield 14 bonded to a leading edge.

The vane 12 further comprises a trailing edge 16, opposite the leading edge, and a pressure side and a suction side extending between the leading and trailing edges of the vane.

The blade has an axis of elongation noted A. One longitudinal end of the vane 12 is free and the opposite longitudinal end is connected to a root 18 for attachment of the blade to a rotor of the turbomachine.

Figure 2:
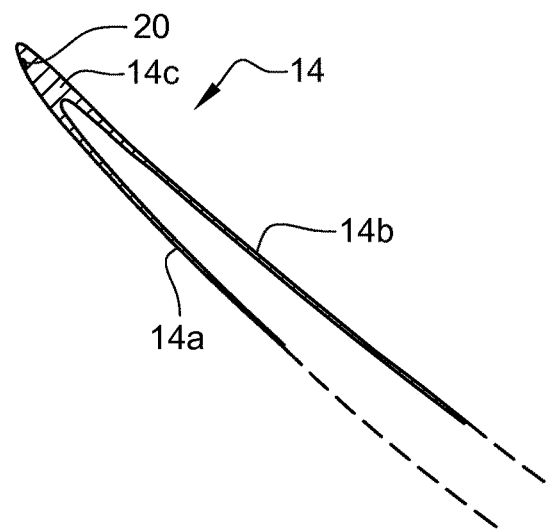
FIG. 2 is a schematic cross-sectional view of a shield of a blade such as that shown in FIG. 1.

As can be seen in FIG. 2, the shield 14 comprises two lateral wings 14a extending respectively on the pressure side and suction side of the vane 12, and a nose 14b connecting the two wings 14a.

The wings 14a, 14b define between them a cavity for receiving the leading edge of the vane 12, as well as the glue for attaching the shield to the vane.

The set of the metal shield 14 is susceptible to damage and therefore has a damaged region 20. The shield 14 must then be subjected to a method for repairing. In particular, the nose 14c is susceptible to damage as shown in FIG. 2. However, this is only an example and the present disclosure may be applied without differentiation to any part of the metal shield 14.

Advantageously, the damaged region 20, which comprises impacts or wear, is located from the top (or head) of the blade 10 to at least two thirds of the total length of the vane. The length of the blade 10 is measured relative to its axis A of elongation. More particularly, the region 20 extends from the top of the blade 10 to the middle part of the shield 14 of the blade 10. This middle part may correspond to the curved portion of the aerodynamic profile of the leading edge of the blade 10.

The nose 14c is susceptible to damage and can then be subjected to a repairing method.

The disclosure proposes a method for repairing a damaged region 20 of a shield 14 of a propeller blade 10, the method comprising:

(a) a step of resetting the leading edge of the vane 12, (b) a step of cooling the entire vane 12, (c) a step of refilling the region 20, by adding a metal material to this region 20 and laser melting of the material (ideally both base and filler), and (d) a step of tailoring the region 20 by machining the molten material.

The cooling step (b) may be performed after or during the resetting step (a).

Figure 3:
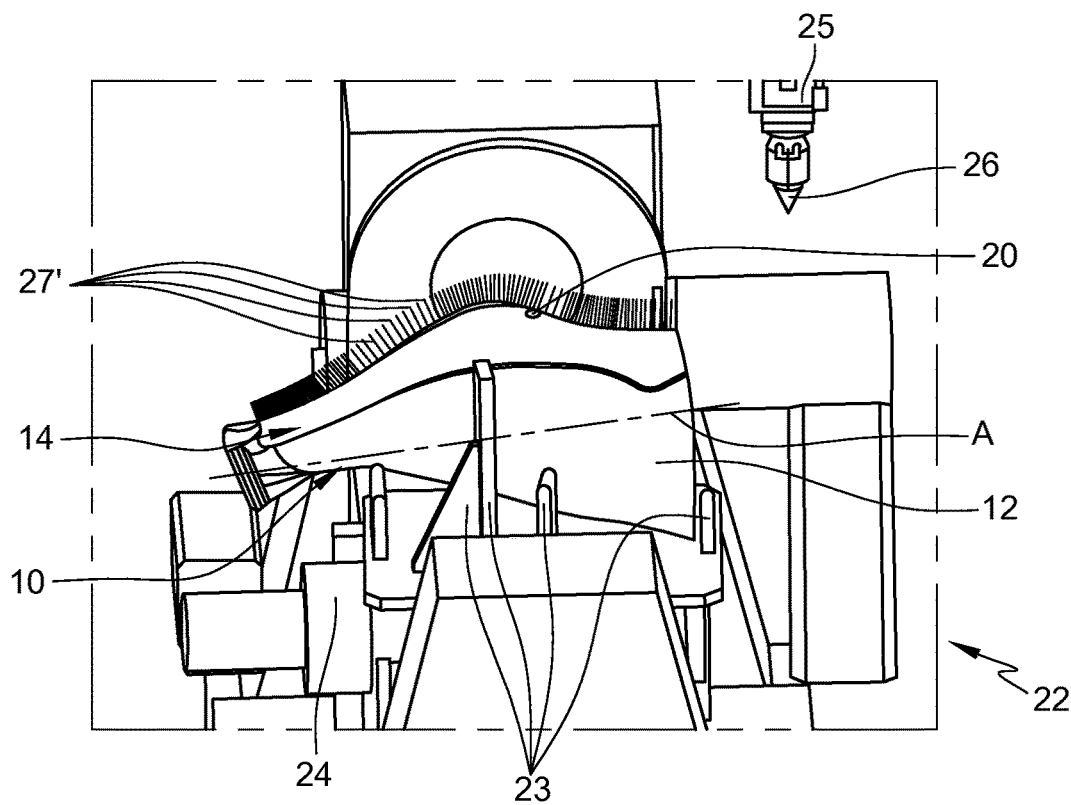
FIG. 3 is a partial schematic perspective view of an installation for implementing the method according to the disclosure.

FIG. 3 shows an example of an installation 22 for implementing the method according to the disclosure.

This installation 22 comprises a frame 24 for fixing and positioning the blade 10. The blade 10 can be fixedly arranged in the installation 22 by means of supports 23 for holding the blade 10. In the example, a number of supports 23 hold the root 18, the trailing edge 16 and the top of the blade 10. The blade 10 is positioned so that its axis A is substantially horizontal. The frame 24 may be designed so that the blade 10 is movably mounted about the axis A and may be positioned so that the shield 14, and in particular its damaged region 20, faces upwards as in the example shown (preferably perpendicular to the laser head 26).

Figure 4:
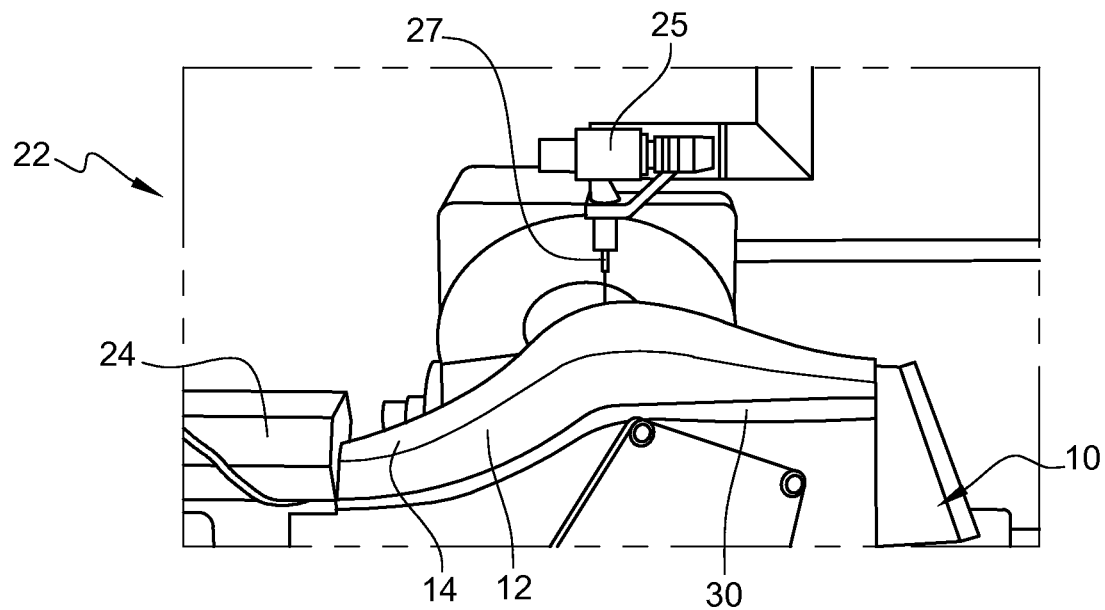
FIG. 4 is a partial schematic perspective view of the installation of FIG. 3 and in which a resetting step is implemented.

With reference to FIG. 4, the system 22 comprises a probe 27 configured to examine by touching the leading edge of the blade 10, in particular to locate the region 20. The probe 27 may come into contact with the edge or top of the nose 14c of the shield 14 and/or the pressure side and suction side surfaces of the wings 14a, 14b of the shield 14. Non-limitingly, several points 27' to be sensed are illustrated in FIG. 3.

The installation 22 comprises a cooling system 30, preferably by conduction. In the example and in a non-limiting way, the blade 10 is at least partially surrounded by the system 30. More particularly, the system 30 is installed so as to specifically cool the leading edge of the blade.

Figure 5:
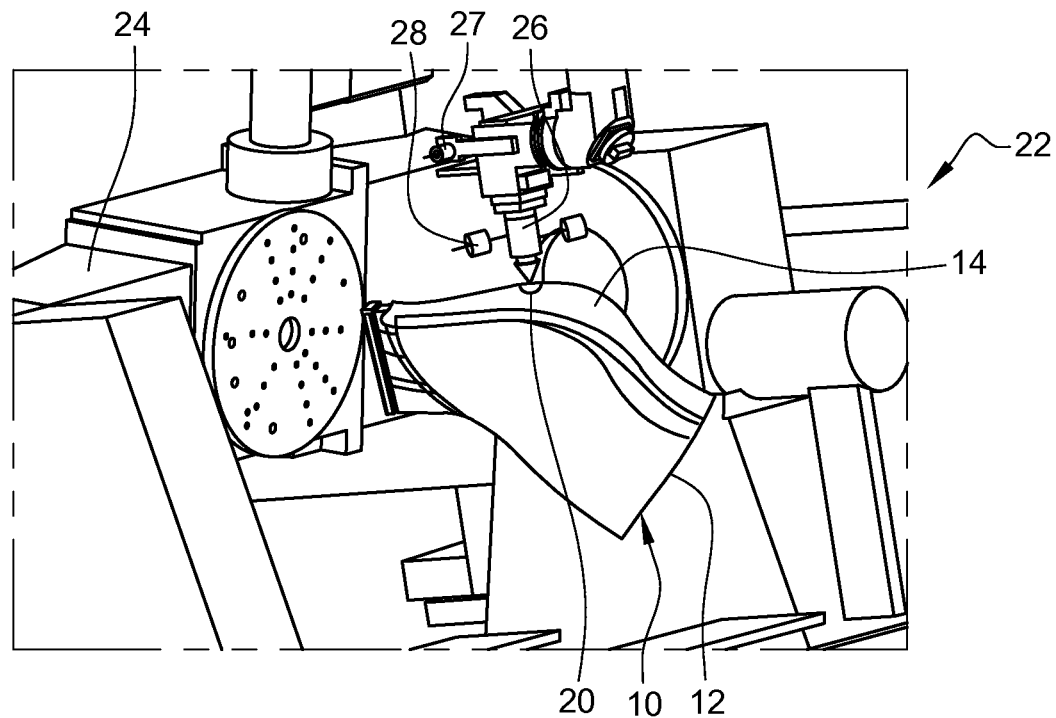
FIG. 5 is a partial schematic perspective view of the installation of FIG. 3 and in which a refilling step is implemented.

With reference to FIG. 5, the installation 22 also comprises a laser head 26 adapted to generate a laser beam to be focused on the region 20. Preferably, the head 26 is equipped with a system 28 for adding refilling material to the region 20. The laser head 26 and the probe 27 are mobile. Advantageously, the laser head 26 and the probe 27 are arranged on the same arm 25 of the installation 22 (visible in FIG. 4). The arm 25 is a mobile apparatus configured to pivot, preferably between 90 and 180°, to bring either the laser head 26 or the probe 27 into view with respect to the blade 10.

The filler material is preferably identical to the material of the shield 14 and is for example a titanium alloy is Ti-6Al-4V, which is the EU specification for TA6V. Advantageously, the filler material is a titanium carbide TiC.

The material is molten by laser and more particularly by an LMD or micro laser method. The LMD uses a continuous laser beam, whereas the micro laser implements a pulsed beam. In the case of the continuous laser, a laser heats the base material and the filler material continuously. As a result, the heat accumulates in the same region and propagates through the base material. In the case of the pulsed laser, the laser "fires" in a dotted line and is less invasive, which enables to control the diffusion region of the heat.

To ensure the health of the blade 10, it may be important to accurately control the temperature of the shield 14, as the hotter the shield, the more heat can be conducted into and damage the glue and material of the vane. For example, there is a risk of the glue melting and the shield becoming detached from the vane.

In practice, a temperature threshold is preferably predetermined, this temperature threshold corresponding to a maximum temperature admissible by the glue and/or the vane. The parameters of the laser head 26 and the cooling system 30 are preferably adjusted to prevent the glue and/or the vane from reaching this threshold. This threshold is for example 120° C.

The cooling system 30 may be designed to cool the vane 12 or the blade 10 by cryogenics (e.g. by spraying liquid CO2 or dry ice or a neutral gas cooled upstream of the spraying circuit) or by the Peltier effect. The cooling temperature is for example between +20 and −20° C., preferably between 0 and 20° C.

The disclosure has several advantages:
- faster repair of the blades in order to put them back into service as soon as possible;
- repairing by adapting to the actual aerodynamic profile of the blades returning from service;
- no need to remove the shield and clean it to remove glue residues;
- avoid the removal of the shield to avoid pairing issues;
- repair a part with a bi-material (composite material-metal material) without using specific means such as an oven, clean room, vacuum machine, etc.
- reloading the metal shield without altering the composite material (or the glue allowing bi-material assembly) thanks to the low energy used in laser welding and the cooling system;
- limit the deformation of the shield induced by refilling;
- extend the service life of the blades (likely to be deformed) for a new use in a turbomachine;
- limit the disposal of return-of-service blades.

The invention claimed is:

1. A method for repairing a blade of a turbomachine propeller, the blade comprising a vane made from an organic-matrix composite and a metal shield bonded to a leading edge of the vane, the metal shield having a damaged region, the method comprising the steps of:
    refilling the damaged region, by adding a metallic filler material to the damaged region and laser melting the metallic filler material to form a molten material,
    tailoring the damaged region by machining the molten material which is solidified,
    resetting the leading edge of the vane prior to said refilling and tailoring steps, and
    cooling the entire vane prior to said refilling and tailoring steps.

2. The method according to claim 1, wherein the resetting step is performed before or simultaneously with the cooling step.

3. The method according to claim 2, wherein the resetting step is performed by means of a movable probe.

4. The method according to claim 1, wherein the vane is cooled to a temperature between +20° C. and −20° C.

5. The method according to claim 4, wherein the cooling is ensured by cryogenics or by the Peltier effect.

6. The method according to claim 1, wherein the metal shield comprises two lateral wings extending respectively on a pressure side and suction side of the vane, and a nose connecting the two wings, the damaged region being located on the nose.

7. The method according to claim 1, wherein a predetermined temperature threshold corresponds to a maximum temperature allowed by the glue and/or the vane, the laser melting being performed by means of a machine, the parameters of which are set to prevent the glue and/or the vane from reaching the temperature threshold.

8. The method of claim 7, wherein the temperature threshold is 120° C.

9. The method according to claim 1, wherein the metallic filler material is identical to a material of the metal shield.

10. The method of claim 9, wherein the metallic filler material is a titanium alloy.

11. The method of claim 1, wherein the metallic filler material is titanium carbide (TIC).

12. The method according to claim 1, wherein, during the refilling step at least, the blade is held on a frame so that the damaged region is oriented upwards.

13. The method according to claim 1, wherein the laser melting is performed by means of a movable laser head.

14. The method according to claim 13, wherein the resetting step is performed by means of a movable probe, and the resetting and refilling steps are performed by means of a single apparatus comprising, respectively, the movable probe and the movable laser head, and wherein the apparatus is configured to pivot to bring the movable probe into contact with the leading edge of the vane during the resetting step, and to bring the movable laser head to face the leading edge of the vane during the refilling step.

15. The method according to claim 1, wherein the laser melting is performed by LMD or µlaser.

16. The method according to claim 4, wherein the vane is cooled to a temperature between 0° C. and −20° C.

17. The method according to claim 14, wherein the movable probe and the movable laser head are arranged on a same arm of the apparatus.

18. The method according to claim 17, wherein the arm pivots between 90° and 180° to bring either the movable laser head or the movable probe in front of the blade.

19. The method of claim 10, wherein the titanium alloy is Ti-6Al-4V.

* * * * *